United States Patent
Anselmi-Tamburini et al.

(10) Patent No.: US 7,601,403 B2
(45) Date of Patent: Oct. 13, 2009

(54) PREPARATION OF DENSE NANOSTRUCTURED FUNCTIONAL OXIDE MATERIALS WITH FINE CRYSTALLITE SIZE BY FIELD ACTIVATION SINTERING

(75) Inventors: Umberto Anselmi-Tamburini, Davis, CA (US); Zuhair A. Munir, Davis, CA (US); Javier E. Garay, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 759 days.

(21) Appl. No.: 11/107,321

(22) Filed: Apr. 15, 2005

(65) Prior Publication Data
US 2009/0224434 A1 Sep. 10, 2009

(51) Int. Cl.
*B05D 3/06* (2006.01)
(52) U.S. Cl. ............... 427/545; 419/45; 419/48; 419/51; 419/52; 427/458; 427/591
(58) Field of Classification Search ............ 419/45
See application file for complete search history.

(56) References Cited

U.S. PATENT DOCUMENTS 5,794,113 A * 8/1998 Munir et al. ............ 419/45
6,261,420 B1   7/2001 Kubota et al.

OTHER PUBLICATIONS

Kim et al., Effect of initial particle size on microstructure of liquid-phase sintered alpha-silicon carbide, 2000, Journal of European Cermic Society, vol. 20, pp. 945-949.*

* cited by examiner

*Primary Examiner*—Michael Barr
*Assistant Examiner*—Andrew Bowman
(74) *Attorney, Agent, or Firm*—Townsend and Townsend and Crew LLP

(57) ABSTRACT

A method for preparing highly dense functional oxides with crystallite size in the range of 10-20 nm. Using a high pressure modification of a the Spark Plasma Sintering (SPS) technique, rapid thermal cycles (<10 min) coupled with very rapid pressure increase up to 1 GPa can be obtained allowing high degree of compaction and very limited grain growth. This combination of techniques was employed to produce the finest-grained ceramics ever prepared in bulk form in the case of fully stabilized zirconia and Sm-doped Ceria.

17 Claims, 5 Drawing Sheets

Zry3-HP5-2

850°C 530 MPa 5 min

CeOSm-NH3-HP5-1

750°C 530MPa 5 min

CeO2-8L-SPSHP5-3
625°C, 600 MPa, 5 min

PREPARATION OF DENSE NANOSTRUCTURED FUNCTIONAL OXIDE MATERIALS WITH FINE CRYSTALLITE SIZE BY FIELD ACTIVATION SINTERING

STATEMENT AS TO RIGHTS TO INVENTIONS MADE UNDER FEDERALLY SPONSORED RESEARCH OR DEVELOPMENT

This invention was made with Government support under Grant No. CTS-0244832, awarded by the National Science Foundation. The Government has certain rights in this invention.

BACKGROUND OF THE INVENTION

The present invention relates generally to the field of material science and engineering. More particularly, the present invention relates to methods for the preparation of dense bulk nanostructured functional oxide materials having a crystallite size of less than about 30 nm.

Nanocrystalline materials have received a widespread attention in the past few years due to their unique combination of physical, chemical, and mechanical properties (e.g., see, Karch, J., Birringer, R. & Gleiter, H, Ceramics ductile at low temperature. *Nature* 330, 556-558 (1987); McFadden, S. X., Mishra, R. S., Valiev, R. Z., Zhilyaev, A. P. & Mukherjee, A. K. Low-temperature superplasticity in nanostructured nickel and metal alloys. *Nature* 398 684-686 (1999); Gleiter, H. Nanostructured materials: basic concepts and microstructure. *Acta Mater.* 48, 1-29 (2000); Moriarty, P. Nanostructured materials. Rep. Prog. Phys. 64, 297-381 (2001); Schoonman, Nanostructured materials in solid state ionics. *J. Solid State Ionics* 135, 5-19 (2000); Schoonman, Nanoionics. *J. Solid State Ionics* 157, 319-326 (2003); Cain, M. & Morrell, R. Nanostructured ceramics: a review of their potential. *Appl. Organometal. Chem.* 15, 321-330 (2001); Yan, D. S., Qiu, H. B., Zheng, Y. S., Gao, L. Bulk nanostructured oxide materials and the superplastic behavior under tensile fatigue at ambient environment. *Nanostructured Materials* 9, 441-450 (1997); and Mayo, M. J. Processing of nanocrystalline ceramics from ultrafine particles. *International Materials Reviews* 41, 85-115 (1996)).

Although significant accomplishments have been made in the area of the synthesis of nanometric powders and clusters (e.g., see Yitai, Q. Chemical preparation and characterization of nanocrystalline materials. *Handbook of Nanostructured Materials and Nanotechnology* 1, 423-480 (2000); Dovy, A. Polyacrylamide gel: an efficient tool for easy synthesis of multicomponent oxide precursors of ceramics and glasses. *Int. J. Inorg. Chem.* 3, 699-707 (2001); Huang, K. & Goodenough, J. B. Wet Chemical Synthesis of Sr- and Mg-Doped LaGaO3, a Perovskite-Type Oxide-Ion Conductor. *J. Sold. State Chem.* 136 274-283 (1998); Aruna, S. T., Muthuraman, M., Patil, K. C. Combustion synthesis and properties of strontium substituted lanthanum manganites $La_{1-x}Sr_xMnO_3$ ($0 \leq x \leq 0.3$). *J. Mater. Chem.* 7, 2499-2503 (1997); and Grigorieva, T. F., Barinova, A. P., Ivanov, E. Yu. & Boldyrev, V. V. *J. Metastable and Nanocrystalline Mat.* 15-16, 553-556 (2003)), the goal of synthesizing fully dense bulk material with grain size below 50 nm remains largely unachieved. This is especially true in the case of ceramic materials. In ceramic materials, the synthesis of bulk nanostructured materials relies mainly on the densification of nanopowders, since alternative routes, such as controlled crystallization of bulk amorphous precursor, have found limited application for these materials (e.g., see Rosenflanz, A., Frey, M., Endres, B., Anderson, T., Richards, E.& Schardt, C. *Nature* 430 761-764 (2004)). As used herein nanopowders refer to materials in powder form having a grain size that is smaller than about 50 nm. The high temperatures required to fully densify ceramic powders result in large grain sizes due to Oswald ripening (e.g., see Cameron, C. P. & Raj Grain growth transition during sintering of colloidally prepared alumina powder compact. *J. Am. Ceram. Soc.* 71, 1031-1035 (1988)).

To overcome this difficulty, unconventional sintering and densification techniques have been proposed for the densification of nanometric ceramic powders. These include, for example, very high pressure-low temperature densification (e.g., see Liao, S. C., Chen, Y.-J., Kear, B. H. & Mayo, W. E. High pressure/low temperature sintering of nanocrystalline alumina. *Nanostruct. Mater.* 10, 1063-1079 (1998); and Liao, S. C., Mayo, W. E. & Pae, K. D. Theory of high pressure/low temperature sintering of bulk nanocrystalline $TiO_2$. *Acta Mater.* 45 4027-4040 (1997)), shock densification (e.g., see Jin, Z. Q., Rockett, C., Liu, J. P., Hokamoto, K., Thadhani, N. N., Shock compaction of bulk nanocomposite magnetic materials, *Materials Science Forum* 465-466, 93-100 (2004)), and magnetic pulsed compaction (e.g., see Ivanov, V., Paranin, S., Khrustov, V., Medvedev, A., Shtol'ts, A., *Key Engineering Materials* 206-213, 377-380 (2002)).

However, while some success was attained by these methods, the results fall short of the ideal goal of having high relative densities (e.g., greater than 95%) and a grain size below 30 nm (e.g., see Tschöpe, A., Sommer, E. & Birringer, R. Grain size-dependent electrical conductivity of polycrystalline cerium oxide. I. Experiment. *Solid State Ionic* 139, 255-265 (2001); and Mondal, P. & Hahn, H. *Ber. Bunsenges. Phys. Chem.* 101, 1765-1766 (1997)). The goal is even more elusive when dense materials with very small grain size (e.g., about 10 nm) are desired. The range of grain size near this value is particularly important since significant variations in bulk physical properties are expected when the grain size approaches this limit (e.g., see Maier, J. Point-defect thermodynamics and size effects. *Solid State Ionics* 131 13-22 (2000)). At approximately this value, half of the atoms belong to the grain boundary region and thus contribute in a different way to the overall property of the material.

Thus far it has not been possible to prepare dense bulk nanostructured material in general and functional oxides in particular with a fine crystallite size of less than about 30 nm.

BRIEF SUMMARY OF THE INVENTION

The present invention provides a method for preparing highly dense functional oxides with crystallite size in the range of 10-20 nm. Using a high pressure modification of a the Spark Plasma Sintering (SPS) technique, rapid thermal cycles (<10 min) coupled with very rapid pressure increase up to approximately 1 GPa can be obtained allowing high degree of compaction and very limited grain growth. This combination of techniques was employed to produce the finest-grained ceramics ever prepared in bulk form in the case of fully stabilized zirconia and Sm-doped Ceria. Other oxides (both simple and complex) have also been consolidated with the products being dense, bulk, and nanostructured. These include ceria (another material for fuel cells), yttrium aluminum garnets (YAG) for laser applications, and alumina as light transmitting medium in high-pressure sodium lamps. In the latter case, the formation of dense materials with small crystallites is a prerequisite for the condition of transparency.

For a further understanding of the nature and advantages of the invention, reference should be made to the following description taken in conjunction with the accompanying figures.

DETAILED DESCRIPTION OF THE INVENTION

Figure 1:
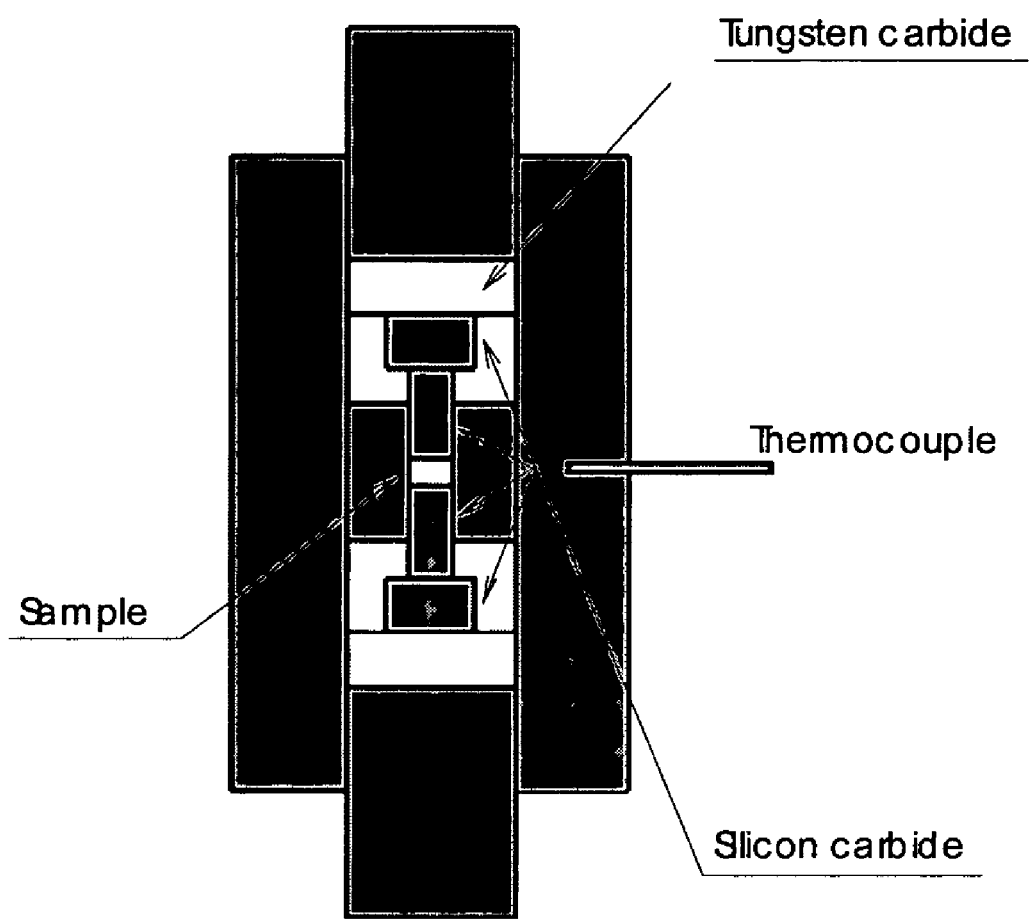
FIG. 1 is an exemplary schematic diagram of a high-pressure die that has been configured for the preparation of dense materials in accordance with the embodiments of the present invention.

Through the use of the methods in accordance with the embodiments of the present invention dense ceramic materials with grain size below 20 nm and approaching 10 nm can routinely be obtained using a high pressure modification of the Spark Plasma Sintering (SPS) technique. The materials produced in accordance with the embodiments of the present invention are the finest-grained ceramics ever prepared in bulk form in the case of fully stabilized zirconia and Sm-doped Ceria. In accordance with the methods of the present invention, rapid thermal cycles (e.g., less than about 10 min) coupled with very rapid pressure increases up to about 800 MPa to 1 GPa can be obtained allowing high degree of compaction and very limited grain growth. As used herein, a high degree of compaction refers to compaction resulting in a relative density of at least 90 percent, and typically greater than 95 percent. Also, as used herein, a very limited grain growth refers to grain growth of less than about 50 percent during a compaction process.

SPS has emerged as an effective technique for the sintering and densification of high temperatures materials (e.g., see Tokita, M. *J. Soc. Powder Tech. Jpn.* 30, 790-804 (1993); Shen, Z., Zhao, Z., Peng H. & Nygren, M. Formation of tough interlocking microstructures in silicon nitride ceramics by dynamic ripening *Nature* 417, 266-269 (2002); and Omori, M., Sintering, Consolidation, reaction and crystal growth by the spark plasma system (SPS). *Materials Science and Engineering* A287, 183-188 (2000)). The technique is similar to hot-pressing, although in this case the sample is heated by a high intensity, low voltage pulsed electric current flowing directly through a conductive die, typically made out of graphite. This allows very fast heating rates (e.g., up to 1000° C./min) when compared with traditional hot-press systems. High intensity electric currents have also been shown to produce significant modification in the reactivity in several solid-state systems (e.g., see Conrad, H. Effects of electric current on solid state phase transformations in metals. *Materials Science & Engineering* A287, 227-237 (2000); and Bertolino, N., Garay, J., Anselmi-Tamburini, U & Munir, Z. A. High-flux current effects in interfacial reactions in Au—Al multilayers. *Phil. Mag. B,* 82, 969-985 (2002)). While the presence of short pulses have been suggested to produce plasma discharges enhancing the early stages of sintering (e.g., see Tokita, M. *J. Soc. Powder Tech. Jpn.* 30, 790-804 (1993)), direct evidence for this has yet to be provided.

In general, the pressure used in the SPS method is limited by the compressive strength of the die material, which for the typical graphite used is about 140 MPa. Such a pressure, when combined with an appropriate thermal and pressure cycle, is adequate to produce fully dense ceramics with grain size between 50 and 100 nm (e.g., see Chaim, R., Shen, Z. & Nygren, M. Transparent nanocrystalline MgO by rapid and low-temperature spark plasma sintering. *J. Mat. Res.* 19, 2527-2531 (2004); and Anselmi-Tamburini, U., Garay, J. E., Munir, Z. A., Tacca, A., Maglia, F. & Spinolo, G. Spark Plasma Sintering and Characterization of Bulk Nanostructured Fully-Stabilized Zirconia (FSZ): I. Densification Studies. *J. Mat. Res.* 19, 3255-3262 (2004)). However, it is not sufficient to obtain nanostructured materials with grain size approaching 10 nm. It has been shown for the densification of fully stabilized (cubic) zirconia that pressure is the parameter with the strongest influence on the final density of nanometric materials (e.g., see Anselmi-Tamburini, U., Garay, J. E., Munir, Z. A., Tacca, A., Maglia, F. & Spinolo, G. Spark Plasma Sintering and Characterization of Bulk Nanostructured Fully-Stabilized Zirconia (FSZ): I. Densification Studies. *J. Mat. Res.* 19, 3255-3262 (2004)).

In order to overcome the limitations in the maximum pressure obtained with a standard SPS setup a double acting die was developed, whose schematic is shown in FIG. 1. With this device a pressure of up to about 800 MPa to 1 GPa on a sample 5 mm in diameter and 1-3 mm thick can routinely be achieved. The maximum pressure can be reached in a few seconds, allowing very fast and versatile sintering cycles. The die is composed of an external graphite die, very similar to the standard die used for SPS. Two protective discs of pure, fully dense tungsten carbide (WC) are placed at the and of each plunger. Since pure WC is not commercially available it was produced using nanometric WC powders, following the conditions reported elsewhere (e.g., see Kim, H.-C., Shon, I.-J., Garay, J. E. & Munir, Z. A. Consolidation and properties of binderless sub-micron tungsten carbide by field-activated sintering. *Int. J. Refrac. Met. Hard Mater.* 22, 257-264 (2004)). The internal smaller die has still a graphite body, but with plungers made out of silicon carbide (commercially available from the Goodfellow Company). It should be noted that larger samples can be made with higher pressure versions of the SPS apparatus with a correspondingly proportional die design, as described above, and that the embodiments of the present invention enable the production of such larger samples.

In accordance with the embodiments of the present invention, during a densification cycles, a moderate pressure (e.g., about 150 MPa) is applied at the beginning of the process. The temperature is then increased with a heating rate of between 50 and 600° C./min. The rise in temperature is accomplished by the application of electric current to the sample. Once the sample reached the hold temperature the pressure was rapidly increased to the final value, up to about 800 MPa to 1 GPa. The sample is held under these conditions for a hold duration of between about 1 min to about 20 min and then the pressure is quickly released and the power turned off. In one embodiment, the hold duration is about 5 min, and the entire densification process takes less then 10 min.

In one embodiment the method of preparing a dense nanometric ceramic material, includes applying an electric current effective to cause heating of the dense nanometric material precursor to a hold temperature; and applying to the dense nanometric material precursor a pressure effective to densify the material, while keeping the temperature below a level sufficient to achieve a high degree of compaction and a limited grain growth in the material. Using this methods, an electric current level on the order of about 500 to about 3000 amperes is employed; a pressure of about 500 MPa to about 1 GPa is employed; and a hold temperature of about 600 Deg. C. to about 950 Deg. C. is employed. The application of the electric current causes a temperature rise rate of about 50 to about 600 Deg. C./min in the dense nanometric material precursor.

Using the methods in accordance with the embodiments of the present invention enables the formation of a dense nanometric material which has a relative density of approximately between 90 and 99 percent. The embodiments of the present invention enable the formation of dense nanometric material having relative densities higher than 95 percent and higher than 98 percent, as well relative densities of nearly 100 percent.

Various dense nanometric ceramic material including zirconia, samarium-doped ceria, yttrium aluminum garnets, alumina, other functional oxides and combinations thereof are made using the methods in accordance with the embodiments of the present invention. These materials are made from simple and complex metal oxide powders, including powders of alumina, cerium oxide, doped cerium oxide, yttria, yttria fully-stabilized zirconia, zirconia, and other functional oxides and combinations thereof. These powders have a grain size of less than 30 nm in diameter.

Figure 2:
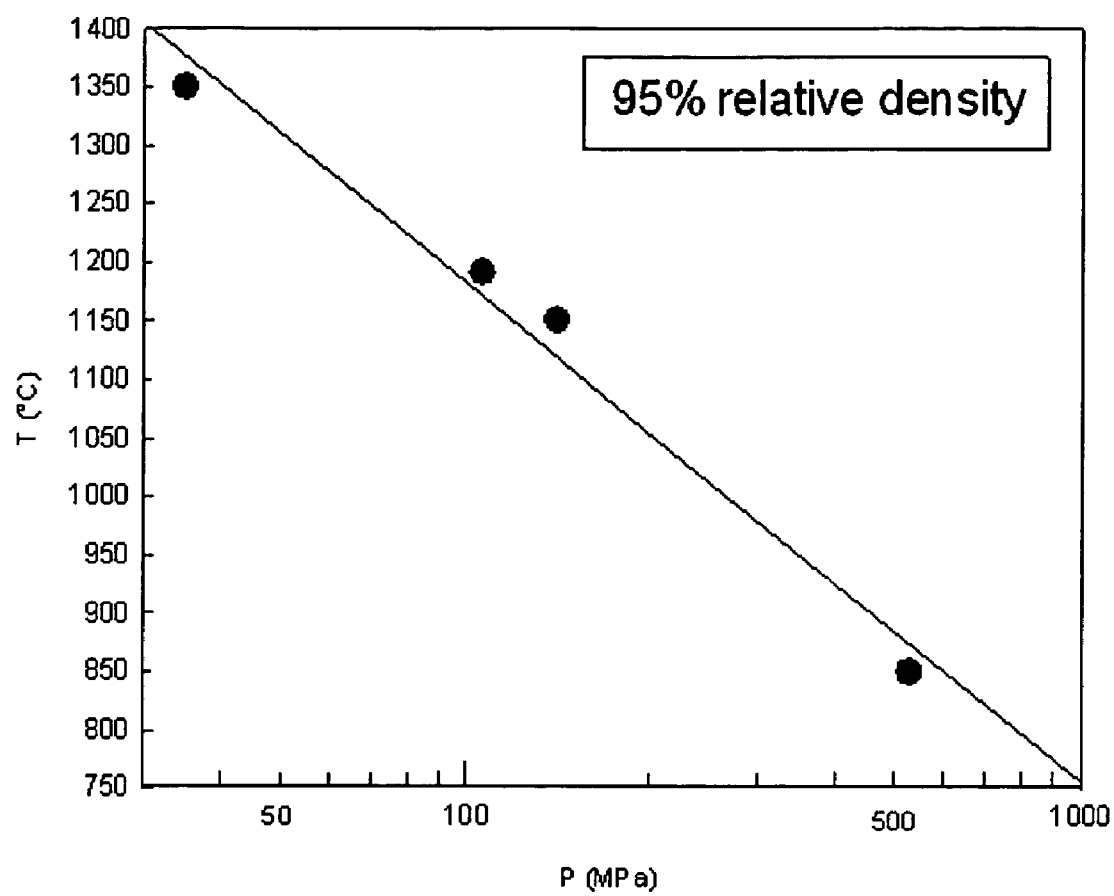
FIG. 2 is a graph showing the relationship between hold temperature and the applied pressure required to obtain samples with a relative density of 95% in the case of nanometric fully stabilized zirconia (8% $YO_{1.5}$), for a hold time of 5 min.

An indication of the influence of pressure on the densification of nanopowders at low temperatures can be seen from FIG. 2 for the SPS densification of nanometric cubic zirconia. This figure (FIG. 2) shows the pressure required to obtain a sample with a relative density of 95% increases exponentially when the temperature is decreased. (Note: the figure is semi-log plot) On the other hand, it has been shown that the grain size in fully stabilize zirconia decreases exponentially with temperature (e.g., see Anselmi-Tamburini, U., Garay, J. E., Munir, Z. A., Tacca, A., Maglia, F. & Spinolo, G. Spark Plasma Sintering and Characterization of Bulk Nanostructured Fully-Stabilized Zirconia (FSZ): I. Densification Studies. *J. Mat. Res.* 19, 3255-3262 (2004)). FIG. 2 shows that in order to keep the temperature below 850° C., a temperature where the diffusivity (and the grain growth) becomes significant, a pressure of about 0.5 GPa is required, while temperatures around 800° C. require a pressure of about 0.8 GPa. Table I, below, lists the characteristics of some of the materials obtained using the high-pressure SPS (HP-SPS) technique in accordance with the embodiments of the present invention. The grain size have been measured from scanning electron microscope (SEM) pictures, while the densities have been determined using the Archimede's method. The powders have been obtained using different wet-chemistry techniques, following the methods described in the papers referenced in the table.

| Material | Starting powder grain size (nm) | Preparation method (Ref) | Heating rate (° C./min) | Hold temper. (° C.) | Hold pressure (MPa) | Hold time (min) | Relative density (%) | Grains size (nm) |
|---|---|---|---|---|---|---|---|---|
| CeO$_2$ | 7 | a | 200 | 625 | 600 | 5 | >98 | 11.5 |
| Ce$_{0.7}$Sm$_{0.32}$ | | b | 200 | 750 | 610 | 5 | >98 | 16 |
| YFSZ (8%) | 6.6 | c | 200 | 850 | 530 | 5 | >98 | 15.5 |

Figure 3:
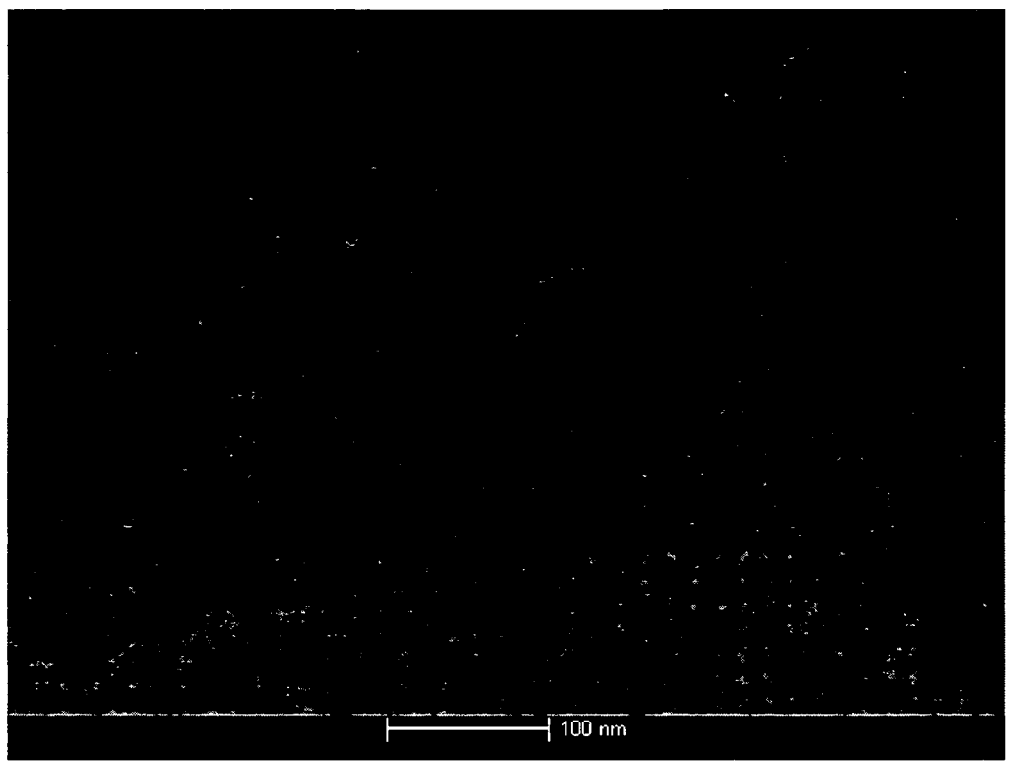
FIG. 3 is an SEM micrograph of a fully stabilized zirconia (8% $YO_{1.5}$) densified at 850° C. and 530 MPa. Hold time: 5 min. (Zry3-HP5-2).
Figure 4:
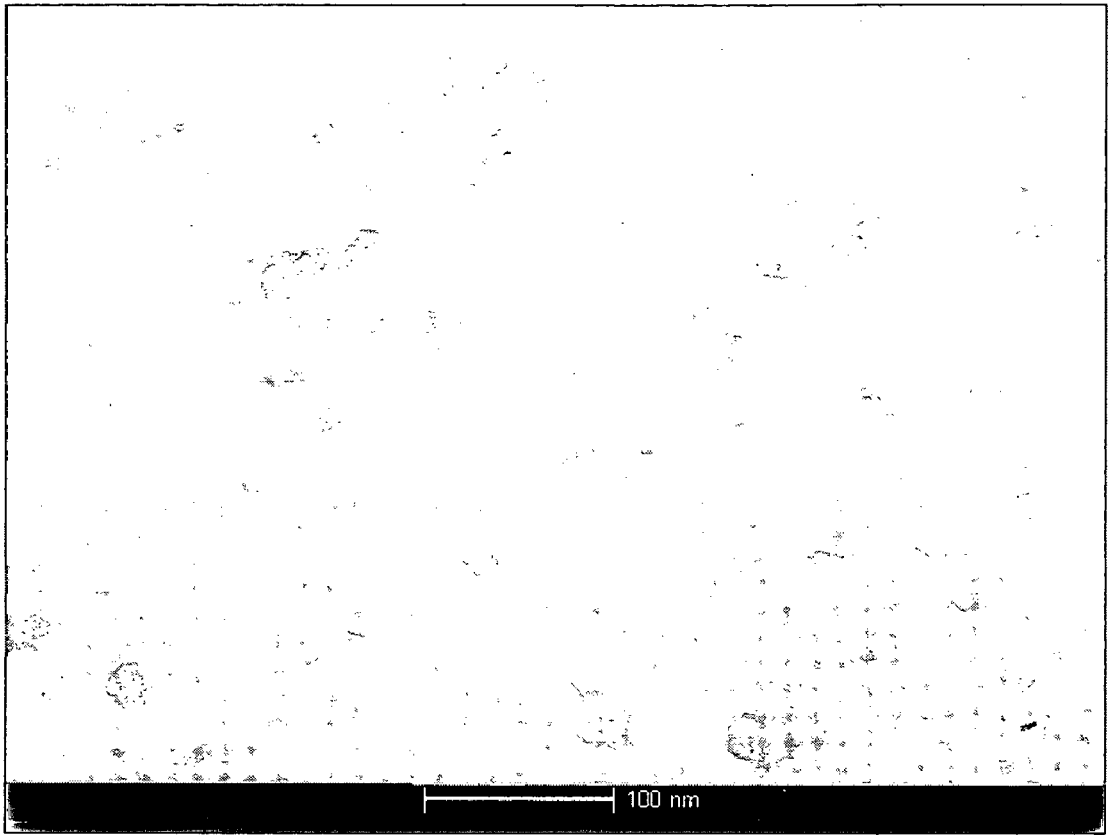
FIG. 4 is an SEM micrograph of cerium oxide doped with 30 mol % samaria densified at 750° C. and 530 MPa. Hold time: 5 min. (CeOSm-NH3-HP5-1).
Figure 5:
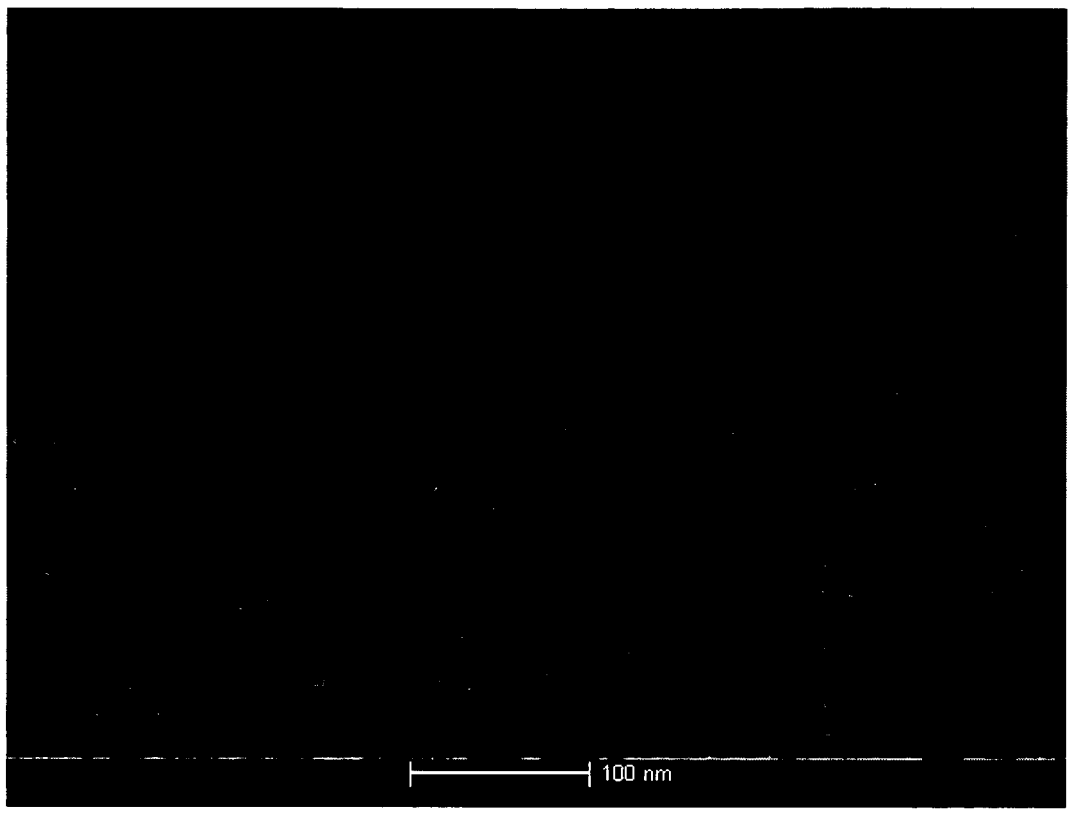
FIG. 5 is an SEM micrograph of pure cerium oxide densified at 625° C. and 600 MPa. Hold time: 5 min. (CeO2-8L-SPSHP5-3).

[a]Kim, S., Maier, J., Partial electronic and ionic conduction in nanocrystalline ceria: role of space charge. J. Eu. Ceram. Soc. 24, 1919-1923 (2004)
[b]Anselmi-Tamburini, U., Munir, Z. A, unpublished work
[c]Anselmi-Tamburini, U., Munir, Z. A, unpublished work Table I above shows that the grain growth is limited and the final grain size is controlled mainly by the grain size of the starting powders. When powders with grain size below 10 nm are used, dense samples with grain size of around 15 nm have been obtained. These results have been reproduced using three different materials: fully-stabilized zirconia (8% mol yttria), pure ceria, and ceria doped with 30% samaria. Other materials have been obtained with larger grain size, but always quite close to the size of the staring powders. FIGS. 3-5 show three SEM images of the samples characterized by the smaller grain size. All three materials show a uniform microstructure with grain size around 15 nm. In all of these cases the starting powders show some degree of agglomeration, but the densification procedure was effective in the elimination of close macroporosity typically associated with the presence of agglomerates in nanopowders. FIGS. 3-5 also show also a very low level of nanoporosity with good connections between the grains.

The methods in accordance with the embodiments of the present invention enable the formation of dense nanometric material from simple and complex metal oxide powders, such as powders of alumina, cerium oxide, doped cerium oxide, yttria, yttria fully-stabilized zirconia, zirconia, garnets, titanium oxides, magnesium oxides, tin oxides, aluminum oxides and other functional oxides, including for example those used for device applications such as functional oxides used for fuel cell devices, laser applications, and those used for chemical and other sensor applications, and combinations thereof.

As will be understood by those skilled in the art, the present invention may be embodied in other specific forms without departing from the essential characteristics thereof. Those skilled in the art will recognize, or be able to ascertain using no more than routine experimentation, many equivalents to the specific embodiments of the invention described herein. Such equivalents are intended to be encompassed by the following claims.

What is claimed is:

1. A method of preparing a dense nanometric ceramic material, comprising:
    applying an electric current effective to cause heating of the dense nanometric material precursor to a hold temperature; and
    applying to the dense nanometric material precursor a pressure effective to densify the material, while keeping the temperature below a level sufficient to achieve a high degree of compaction and a limited grain growth in the material wherein a pressure of about 500 MPa to about 1 GPa is employed and wherein the dense nanometric material precursor is a powder having a grain size of less than 30 nm in diameter.

2. The method of claim 1 wherein an electric current level on the order of about 500 to about 3000 amperes is employed.

3. The method of claim 1 wherein a temperature of about 600 Deg. C. to about 950 Deg. C. is employed.

4. The method of claim 1 wherein said applying an electric current causes a temperature rise rate of about 50 to about 600 Deg. C./min in the dense nanometric material precursor.

5. The method of claim 1 wherein the dense nanometric material has a relative density of about between 90 and 98 percent.

6. The method of claim 1 wherein the dense nanometric material has a relative density of more than 95 percent.

7. The method of claim 1 wherein the dense nanometric material has a relative density of more than 98 percent.

8. The method of claim 1 wherein the dense nanometric material has a grain size below 30 nm.

9. The method of claim 1 wherein the dense nanometric material has a grain size below 20 nm.

10. The method of claim 1 wherein the dense nanometric ceramic material is selected from the group consisting of zirconia, samarium-doped ceria, yttrium aluminum garnets, alumina, other functional oxides and combinations thereof.

11. The method of claim 1 wherein the powder comprises metal oxide particles.

12. The method of claim 11 whereon the metal oxide particles are selected from the group consisting of simple metal oxide particles and complex metal oxide particles.

13. The method of claim 11 wherein the metal oxide particles are a member selected from the group consisting of alumina, cerium oxide, doped cerium oxide, yttria, yttria fully-stabilized zirconia, zirconia, and other functional oxides and combinations thereof.

14. The method of claim 1 comprising holding the nanometric material precursor at the hold temperature and the pressure for a duration of between about 1 min and about 20 min.

15. A method of preparing a dense nanometric ceramic material, comprising:

applying an electric current of approximately between 1000 and 2000 amperes to a functional metal oxide powder material to cause heating of the metal oxide powder material to a hold temperature; and applying to the metal oxide powder a pressure in the range between approximately 800 MPa and 1 GPa to densify the material, while keeping the temperature below a level sufficient to achieve a high degree of compaction and a limited grain growth in the material wherein the metal oxide powder material has an unsintered grain size of less than 30 nm in diameter.

16. The method of claim 15 wherein a temperature of about 600 Deg. C. to about 950 Deg. C. is employed.

17. The method of claim 15 wherein the dense nanometric material has a relative density of more than 95 percent.

* * * * *